US 7,890,786 B2

(12) United States Patent
Chen et al.

(10) Patent No.: US 7,890,786 B2
(45) Date of Patent: Feb. 15, 2011

(54) MEMORY CONTROLLER AND SIGNAL SYNCHRONIZING METHOD THEREOF

(75) Inventors: Yi Lin Chen, Taipei (TW); Yi Chih Huang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 691 days.

(21) Appl. No.: 11/948,800

(22) Filed: Nov. 30, 2007

(65) Prior Publication Data

US 2008/0133959 A1 Jun. 5, 2008

(30) Foreign Application Priority Data

Dec. 1, 2006 (TW) .............. 95144638 A

(51) Int. Cl.
*G06F 1/04* (2006.01)

(52) U.S. Cl. ................ 713/401; 713/501; 713/503

(58) Field of Classification Search ............. 713/400, 713/401, 500, 501, 503, 600
See application file for complete search history.

(56) References Cited

U.S. PATENT DOCUMENTS 6,438,670 B1 8/2002 McClannahan

| 6,453,434 | B2 | 9/2002 | Delp et al. |
| 6,469,940 | B1 | 10/2002 | Tsuda |
| 6,738,918 | B2 * | 5/2004 | Toda ........................ 713/400 |
| 6,889,335 | B2 | 5/2005 | Hargis et al. |
| 2005/0044441 | A1 | 2/2005 | Sohn et al. |
| 2008/0136479 | A1 * | 6/2008 | You et al. .................. 327/161 |

FOREIGN PATENT DOCUMENTS

KR 20040046328 A 6/2004
TW 591658 6/2004

* cited by examiner

*Primary Examiner*—Dennis M Butler

(57) ABSTRACT

A memory controller includes an output buffer for receiving a clock signal and outputting the clock signal to an external memory; and a replica buffer for receiving the clock signal and outputting the clock signal to a counting circuit; wherein the replica buffer and the output buffer have the same delay time such that the clock signal received by the counting circuit can be synchronized with that received by the external memory, and therefore the counting circuit can accurately count to a predetermined time according to the clock signal and output an enabling signal to enable a data control signal. The present invention further provides a signal synchronizing method for the memory controller.

20 Claims, 3 Drawing Sheets

US 7,890,786 B2

MEMORY CONTROLLER AND SIGNAL SYNCHRONIZING METHOD THEREOF

CROSS REFERENCE TO RELATED APPLICATION

This application claims the priority benefit of Taiwan Patent Application Serial Number 095144638, filed on Dec. 1, 2006, the full disclosure of which is incorporated herein by reference.

BACKGROUND OF THE INVENTION

1. Field of the Invention

This invention generally relates to a memory controller, and more particularly, to a memory controller having timing compensation function.

2. Description of the Related Art

For a conventional memory controller coupled to a double data rate (DDR) memory, the memory controller outputs a clock signal CLK to the DDR memory and reads out data contained in a data signal DQ from the DDR memory or writes the data into the DDR memory according to a bi-directional data strobe signal DQS. In addition, the memory controller outputs a control signal CMD to the DDR memory for determining a reading operation or a writing operation to be carried out in the DDR memory.

SUMMARY OF THE INVENTION

It is an object of the present invention to provide a memory controller, which can properly synchronize a clock signal received by an internal counting circuit inside the memory controller with a clock signal received by an external memory thereby solving the problems existing in the prior art.

In order to achieve the above object, the present invention provides a memory controller including an output buffer, a replica buffer and a counting circuit. The output buffer is for receiving a clock signal and outputting the clock signal to an external memory, and the replica buffer is for receiving the clock signal and outputting the clock signal to the counting circuit, wherein the replica buffer and the output buffer have the same delay time such that the clock signal received by the counting circuit can be synchronized with that received by the external memory. In this manner, the counting circuit can accurately count to a predetermined time according to the clock signal and timely output an enabling signal to enable a data control signal.

The present invention further provides a signal synchronizing method for controlling the signal output of a memory. The method includes the steps of: receiving a first clock signal and outputting a second clock signal to the memory according to the first clock signal, wherein the second clock signal is delayed for a predetermined time with respect to the first clock signal; receiving the first clock signal and outputting a third signal according to the first clock signal, wherein the third clock signal is delayed for the predetermined time with respect to the first signal; and receiving the third clock signal and counting to a predetermined value according to the third clock signal so as to output a control signal.

The replica buffer according to the embodiment of the present invention is a replica circuit of the output buffer such that the variance of the delay time of the replica buffer caused by operating temperature is the same with that of the output buffer; therefore, even if the replica buffer operates under a high operating temperature, it can still accurately compensate the time delay of the clock signal CLK caused by the output buffer.

In one embodiment of the present invention, the replica buffer is disposed on a power input region or a ground input region such that the area for forming circuits within the memory controller can be saved.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
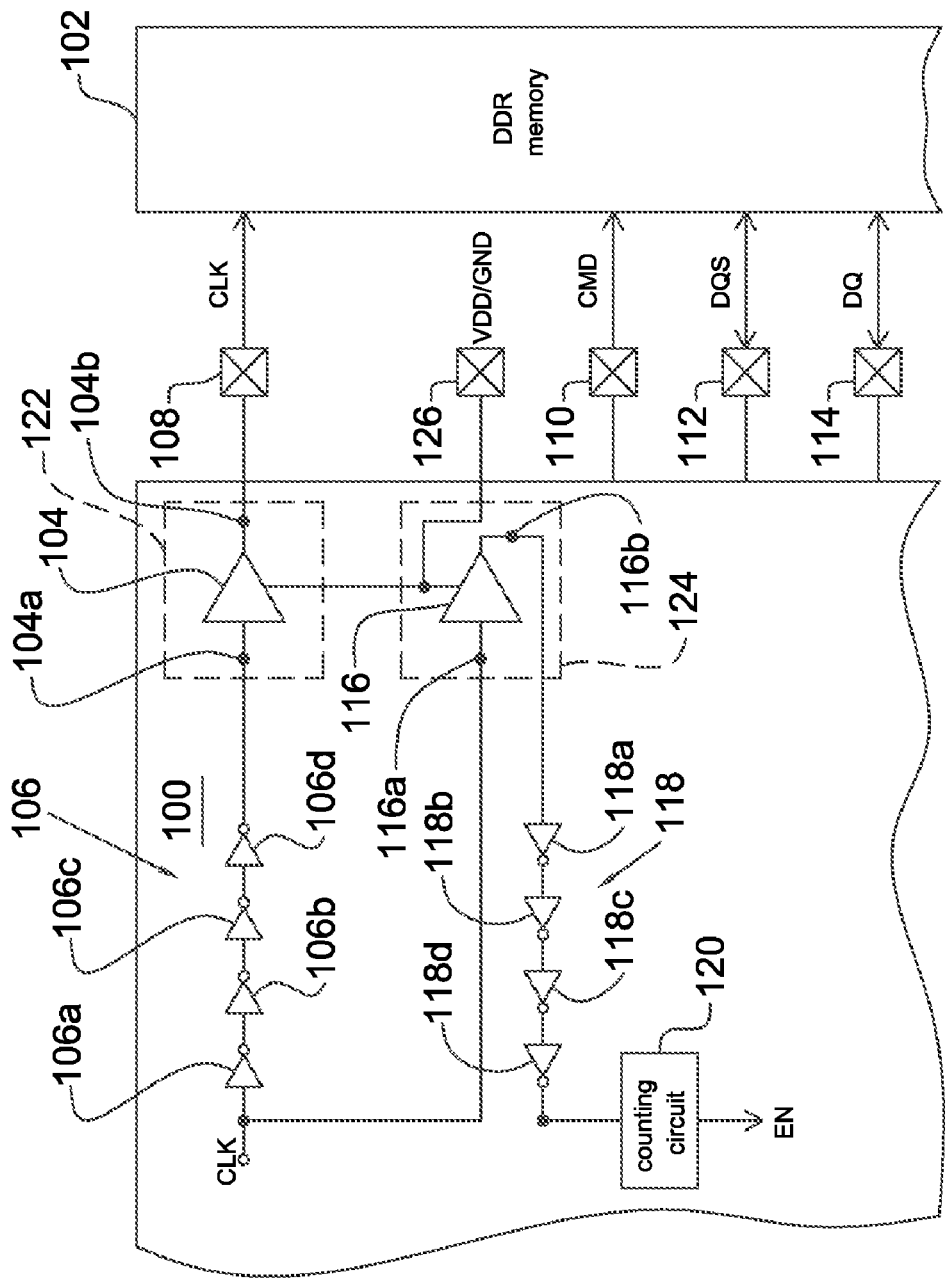
FIG. 1 shows a schematic circuit diagram of a memory controller according to one embodiment of the present invention coupled to a double data rate (DDR) memory.

FIG. 1 shows a schematic circuit diagram of a memory controller 100 according to one embodiment of the present invention, and the memory controller 100 is coupled to a double data rate (DDR) memory 102. The memory controller 100 outputs a clock signal CLK to the DDR memory 102, and reads out data contained in a data signal DQ from the DDR memory 102 or writes the data into the DDR memory 102 according to a bi-directional data strobe signal DQS. The memory controller 100 includes an output buffer 104 and a clock tree circuit 106. The clock tree circuit 106 is formed by connecting several inverters 106a, 106b, 106c and 106d in series and receives a clock signal CLK generated by a clock source (not shown) through the inverter 106a. After the clock signal CLK is received by the inverter 106a, the clock signal CLK will pass through the inverters 106b, 106c and 106d and then reach the input 104a of the output buffer 104. The output buffer 104 receives the clock signal CLK outputted by the inverter 106d through its input 104a and then drives the clock signal CLK to an input/output (I/O) pad 108 through its output 104b such that the clock signal CLK can be sent to the DDR memory 102 through the I/O pad 108. The output buffer 104 has a delay time Δt such that the clock signal CLK outputted by its output 104b has the delay time Δt, i.e. a phase difference, with respect to the clock signal CLK received by its input 104a. In addition, the memory controller 100 has an input/output (I/O) pad 110 for outputting a control signal CMD to the DDR memory 102 so as to determine a reading operation or a writing operation to be carried out in the DDR memory 102; an I/O pad 112 for transmitting the data strobe signal DQS; and an I/O pad 114 for transmitting the data signal DQ.

The memory controller 100 further has a replica buffer 116, a replica clock tree circuit 118 and a counting circuit 120. The replica buffer 116 has an input 116a connected to the inverter 106a for receiving the clock signal CLK generated by the clock source (not shown). The replica buffer 116 further has an output 116b for driving the clock signal CLK to the replica clock tree circuit 118. The replica clock tree circuit 118 is formed by connecting a plurality of inverters 118a, 118b, 118c and 118d in series. The replica clock tree circuit 118 receives the clock signal CLK outputted by the replica buffer 116 through the inverter 118a and transmits the received clock signal CLK to the counting circuit 120 through the inverter 118d. The counting circuit 120 consists of several registers. The counting circuit 120 receives the clock signal CLK from the inverter 118d of the replica clock tree circuit 118, and then counts to a predetermined value, i.e. a predetermined time, according to the clock signal CLK so as to output an enabling signal EN to enable the data strobe signal DQS.

In this embodiment, the replica buffer 116 is a replica circuit of the output buffer 104, i.e. identical circuit. Therefore, the replica buffer 116 and the output buffer 104 have the same delay time Δt and use the same power voltage VDD as their supply voltage. In addition, the replica clock tree circuit 118 is a replica circuit of the clock tree circuit 106, i.e. identical circuit. Also, the replica clock tree circuit 118 and the clock tree circuit 106 have the same delay time Δt1 and use the same power voltage (not shown) as their supply voltage. Therefore, the time that the clock signal CLK takes to pass through the replica buffer 116 and the replica clock tree circuit 118 is identical to the time that the clock signal CLK takes to pass through the clock tree circuit 106 and the output buffer 104, such that the clock signal CLK received by the counting circuit 120 from the inverter 118d can be synchronized with the clock signal CLK received by the DDR memory 102 from the I/O pad 108.

Figure 2:
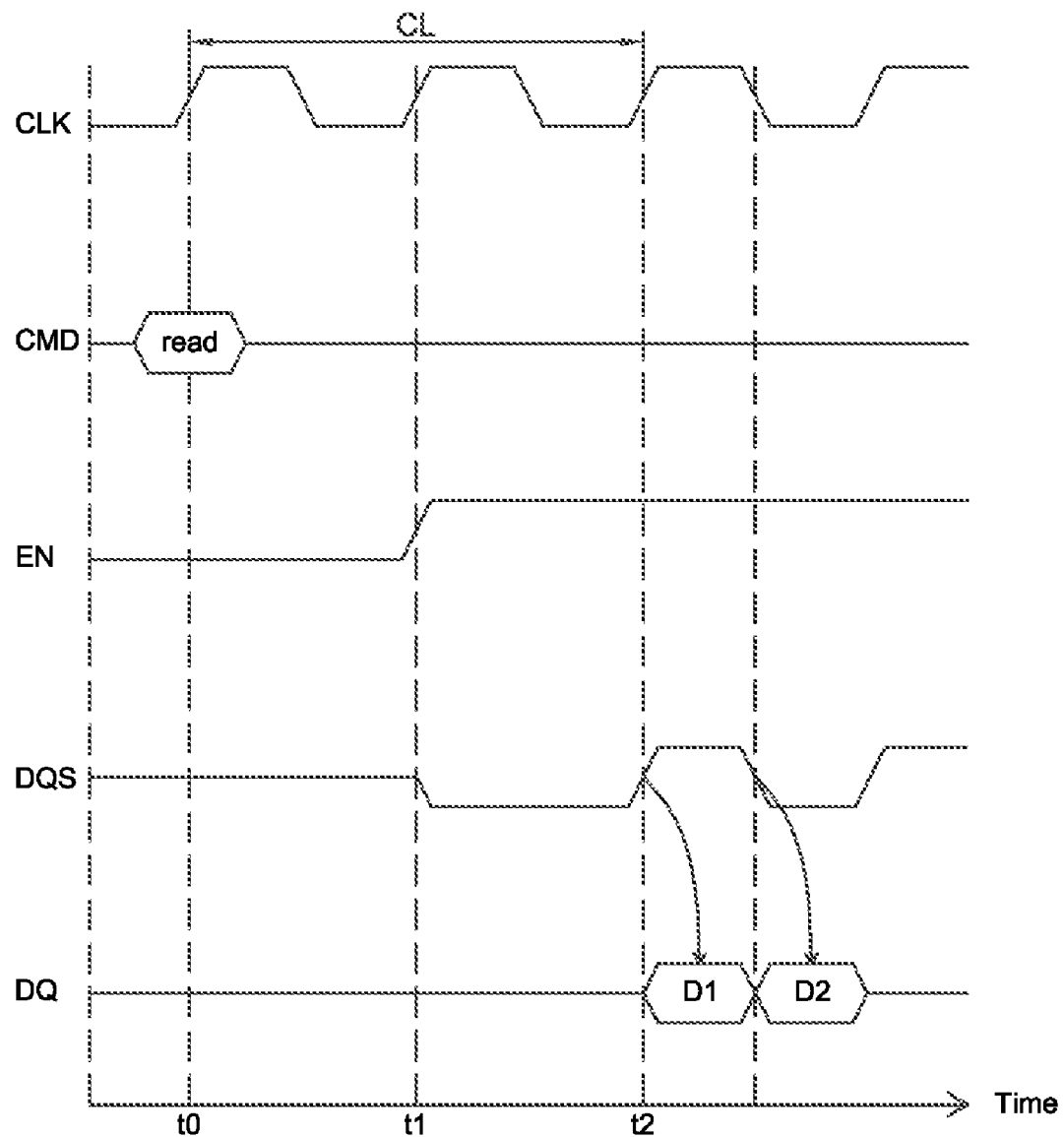
FIG. 2 shows a timing diagram of the signals CLK, CMD, DQS, DQ at the I/O pads and the enabling signal EN shown in FIG. 1.

FIG. 2 shows a timing diagram of the signals CLK, CMD, DQS, DQ respectively at the I/O pads 108, 110, 112, 114 and the enabling signal EN outputted by the counting circuit 120 shown in FIG. 1 for illustrating a reading operation carried out by the memory controller 100 from the DDR memory 102.

In the reading operation, the memory controller 100 sends a reading command through the control signal CMD to the DDR memory 102 at time t0 and then, after a CAS latency CL, starts to sample data D1 and D2 outputted by the DDR memory 102 according to the rising edge and the falling edge of the data strobe signal DQS. The CAS latency CL generally uses the cycle number of the clock signal CLK as a unit, and has different values according to different memory standards and operation speeds. In this embodiment, the CAS latency CL is equal to two cycles of the clock signal CLK at the I/O pad 108.

When the memory controller 100 sends out a reading command through the control signal CMD, the counting circuit 120 starts to count to a predetermined time according to the clock signal CLK outputted by the inverter 118d. When the counting circuit 120 counts to time t1, it outputs an enabling signal EN to enable the data strobe signal DQS such that the data D1 and D2 contained in the data signal DQ can be sampled according to the data strobe signal DQS. It should be understood that, since the clock signal CLK outputted by the inverter 118d is synchronized with the clock signal CLK at the I/O pad 108, the counting circuit 120 can accurately count to the time t1 and timely enable the data strobe signal DQS. In addition, although the voltage level of the enabling signal EN changes from low to high at time t1 to enable the data strobe signal DQS, it is not used to limit the present invention. In an alternative embodiment, the voltage level of the enabling signal EN can also change from high to low to enable the data strobe signal DQS.

In the memory controller 100, the output buffer 104 is disposed on an I/O region 122, and the replica buffer 116 is disposed on another I/O region 124. In one embodiment, the I/O region 124 is a power input region for receiving a power voltage VDD straight from an I/O pad 126. In an alternative embodiment, the replica buffer 116 is electrically connected to the power voltage VDD and the power voltage VDD is served as its supply voltage. In a further alternative embodiment, the output buffer 104 is also electrically connected to the power voltage VDD and the power voltage VDD is served as its supply voltage.

In other embodiment, the I/O region 124 is a ground input region for receiving a ground GND straight from the I/O pad 126. In an alternative embodiment, the replica buffer 116 is electrically connected to the ground GND and the ground GND is served as its reference potential. In a further alternative embodiment, the output buffer 104 is also electrically connected to the ground GND and the ground GND is served as its reference potential.

In the above embodiment, the "I/O region" is the region through which the memory controller 100 can input a signal from or output a signal to an external circuit. The memory controller 100 has a plurality of I/O regions inside, and each I/O region has the same area. The I/O regions are divided to a plurality of signal I/O regions, at least one power input region and at least one ground input region. Each signal I/O region has at least one input buffer or one output buffer disposed thereon. In addition, each of the power input region and the ground input region only has a diode disposed thereon for preventing the electrostatic discharge problem and is free of any input or output buffer; therefore, the power input region and the ground input region still have an blank area which can be utilized. In one embodiment of the present invention, the replica buffer 116 is preferably disposed on the blank area of the power input region and the ground input region; therefore, no additional area within the memory controller 100 is required for forming the replica buffer 116.

In this embodiment, the replica buffer 116 and the replica clock tree circuit 118 are respectively identical to the output buffer 104 and the clock tree circuit 106 such that the variance of the delay time of the replica buffer 116 and the replica clock tree circuit 118 caused by operating temperature is the same with that of the output buffer 104 and the clock tree circuit 106. Therefore, even if the replica buffer 116 and the replica clock tree circuit 118 operate under a high operating temperature, they can still accurately compensate the time delay of the clock signal CLK caused by the output buffer 104 and the clock tree circuit 106 such that the clock signal CLK received by the counting circuit 120 from the inverter 118d can be synchronized with the clock signal CLK received by the DDR memory 102.

Figure 3:
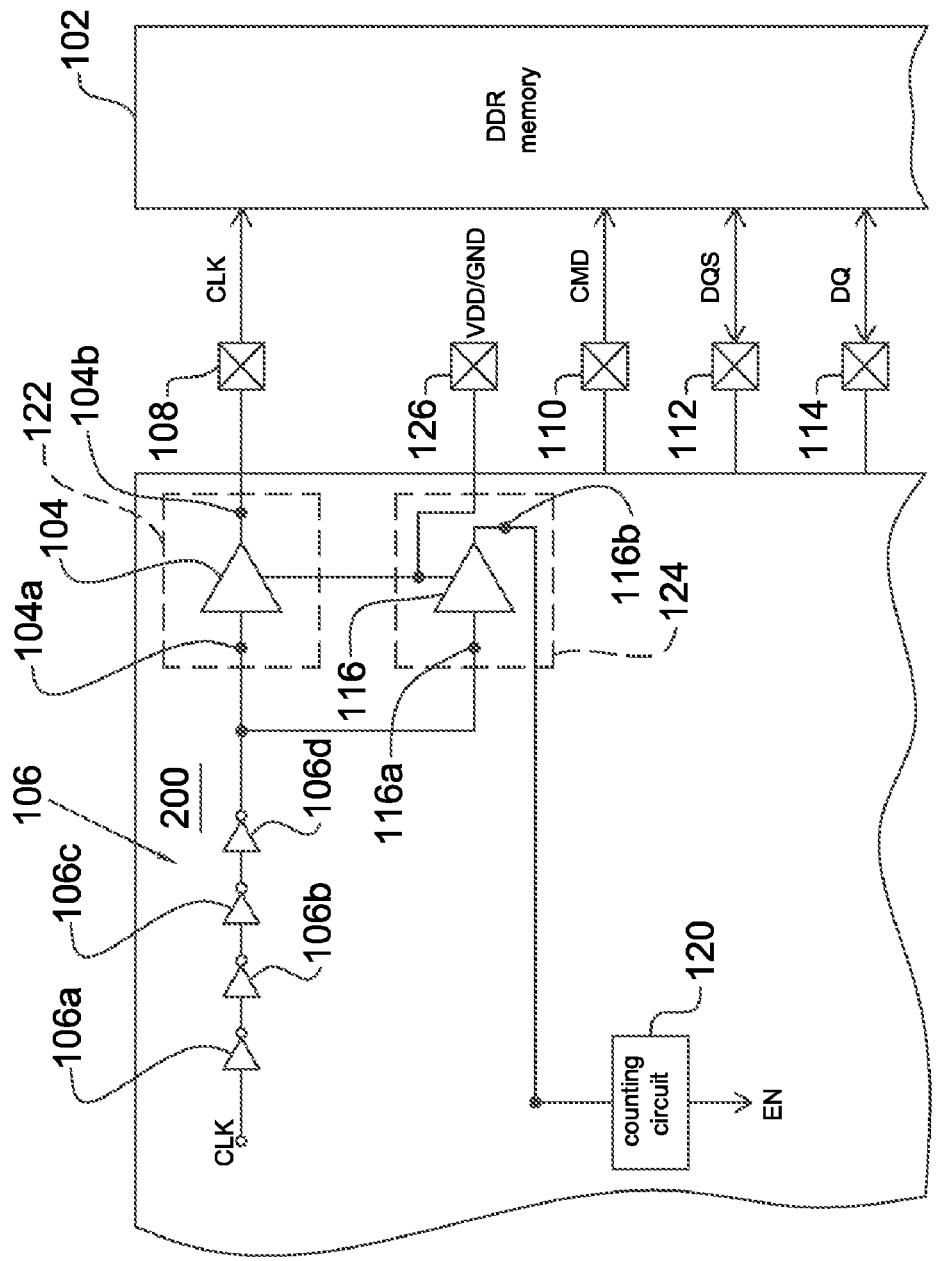
FIG. 3 shows a schematic circuit diagram of a memory controller according to another embodiment of the present invention coupled to a double data rate (DDR) memory.

FIG. 3 shows a schematic circuit diagram of a memory controller 200 according to another embodiment of the present invention, and the memory controller 200 is coupled to a double data rate (DDR) memory 102. The elements of FIG. 2 identical to that of FIG. 3 are designated by the same reference numerals and will not be described in detail. In memory controller 200, the input 116a of the replica buffer 116 is connected straight to the output of the inverter 106d and the input 104a of the output buffer 104 for receiving the clock signal CLK from the inverter 106d. The output 116b of the replica buffer 116 is connected straight to the counting circuit 120 for driving the received clock signal CLK straight to the counting circuit 120. In this embodiment, since the replica buffer 116 is identical to the output buffer 104, the clock signal CLK received by the counting circuit 120 is able to be synchronized with the clock signal CLK received by the DDR memory 102 such that the counting circuit 120 can accurately count to the time t1 and thus output an enabling signal EN to enable the data strobe signal DQS.

It should be noted that, the memory controllers 100 and 200 according to the embodiments of the present invention are not limited to control a DDR memory, and they also can be applied to control other types of dynamic random access memory (DRAM). Further, the data strobe signal DQS and the data signal DQ can be the data control signal and data signal utilized in other types of DRAM memory, and they are not limited to the data strobe signal DQS and the data signal DQ under the DDR memory standard.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A memory controller for controlling a memory, comprising:
   a first buffer having an input for receiving a first clock signal and an output for outputting a second clock signal to the memory, wherein the second clock signal is delayed for a predetermined time with respect to the first clock signal;
   a second buffer having an input for receiving the first clock signal and an output for outputting a third clock signal, wherein the third clock signal is delayed for the predetermined time with respect to the first clock signal; and
   a counting circuit for receiving the third clock signal and counting to a predetermined value according to the third clock signal so as to output a control signal.

2. The memory controller as claimed in claim 1, wherein the second buffer is identical to the first buffer.

3. The memory controller as claimed in claim 1, further comprising a first input/output (I/O) region and a second input/output (I/O) region, wherein the first buffer is disposed on the first input/output region while the second buffer is disposed on the second input/output region.

4. The memory controller as claimed in claim 3, wherein the second input/output region is a power input region for receiving a power voltage.

5. The memory controller as claimed in claim 4, wherein the second buffer is electrically connected to the power voltage.

6. The memory controller as claimed in claim 4, wherein the first buffer is electrically connected to the power voltage.

7. The memory controller as claimed in claim 3, wherein the second input/output region is a ground input region for receiving an external ground.

8. The memory controller as claimed in claim 7, wherein the second buffer is electrically connected to the external ground.

9. The memory controller as claimed in claim 7, wherein the first buffer is electrically connected to the external ground.

10. The memory controller as claimed in claim 1, further comprising:
    a clock source for generating the first clock signal;
    at least one first inverter coupled to between the clock source and the input of the first buffer; and
    at least one second inverter coupled to between the output of the second buffer and the counting circuit.

11. The memory controller as claimed in claim 1, further comprising:
    a first delay circuit coupled to between a clock source and the input of the first buffer; and
    a second delay circuit coupled to between the output of the second buffer and the counting circuit.

12. The memory controller as claimed in claim 1, wherein the control signal is for enabling a data strobe signal (DQS) of the memory.

13. A memory controller, comprising:
    a first driving circuit having an input for receiving a first clock signal and an output for outputting a second clock signal to a memory, wherein the second clock signal is delayed for a predetermined time with respect to the first clock signal;
    a second driving circuit having an input for receiving the first clock signal and an output for outputting a third clock signal, wherein the third clock signal is delayed for the predetermined time with respect to the first clock signal; and
    a counting circuit for receiving the third clock signal and counting to a predetermined value according to the third clock signal so as to output a control signal.

14. The memory controller as claimed in claim 13, wherein the second driving circuit is identical to the first driving circuit.

15. The memory controller as claimed in claim 13, further comprising a first input/output (I/O) region and a second input/output (I/O) region, wherein the first driving circuit is disposed on the first input/output region while the second driving circuit is disposed on the second input/output region.

16. The memory controller as claimed in claim 15, wherein the second input/output region is a power input region for receiving a power voltage.

17. The memory controller as claimed in claim 13, further comprising:
    a clock source for generating the first clock signal;
    at least one first inverter coupled to between the clock source and the input of the first driving circuit; and
    at least one second inverter coupled to between the output of the second driving circuit and the counting circuit.

18. The memory controller as claimed in claim 13, further comprising:
    a first delay circuit coupled to between a clock source and the input of the first driving circuit; and
    a second delay circuit coupled to between the output of the second driving circuit and the counting circuit.

19. A signal synchronizing method for controlling the signal output of a memory, the method comprising:
    receiving a first clock signal and outputting a second clock signal to the memory according to the first clock signal, wherein the second clock signal is delayed for a predetermined time with respect to the first clock signal;
    receiving the first clock signal and outputting a third clock signal according to the first clock signal, wherein the third clock signal is delayed for the predetermined time with respect to the first signal; and
    receiving the third clock signal and counting to a predetermined value according to the third clock signal so as to output a control signal.

20. The signal synchronizing method as claimed in claim 19, wherein the control signal is for enabling a data strobe signal (DQS) of the memory.

* * * * *